(12) United States Patent
Camenisch et al.

(10) Patent No.: US 12,388,628 B2
(45) Date of Patent: Aug. 12, 2025

(54) DISTRIBUTED NETWORK HAVING A PLURALITY OF SUBNETS

(71) Applicant: DFINITY STIFTUNG, Zürich (CH)

(72) Inventors: Jan Camenisch, Thalwil (CH); Manu Drijvers, Zürich (CH); Jens Groth, Zurich (CH); Björn Tackmann, Zürich (CH)

(73) Assignee: DFINITY STIFTUNG, Zürich (CH)

( * ) Notice: Subject to any disclaimer, the term of this patent is extended or adjusted under 35 U.S.C. 154(b) by 290 days.

(21) Appl. No.: 18/014,111

(22) PCT Filed: Jun. 30, 2020

(86) PCT No.: PCT/EP2020/068420
§ 371 (c)(1),
(2) Date: Dec. 30, 2022

(87) PCT Pub. No.: WO2022/002375
PCT Pub. Date: Jan. 6, 2022

(65) Prior Publication Data
US 2023/0269092 A1 Aug. 24, 2023

(51) Int. Cl.
*H04L 9/08* (2006.01)
*H04L 9/32* (2006.01)

(52) U.S. Cl.
CPC ............ *H04L 9/085* (2013.01); *H04L 9/3247* (2013.01)

(58) Field of Classification Search
CPC ...................................................... H04L 9/085
See application file for complete search history.

(56) References Cited

U.S. PATENT DOCUMENTS 7,072,337 B1 * 7/2006 Arutyunov ............ H04L 61/103
709/245
9,055,000 B1 * 6/2015 Ghosh ................... H04L 49/604
(Continued)

FOREIGN PATENT DOCUMENTS

| JP | 6651042 B1 | 2/2020 |
| JP | 2020516164 | 5/2020 |

(Continued)

OTHER PUBLICATIONS

Kei Sasaki et al., Implementation of a group file sharing system that allows multiple attributions with a single key, Proceedings of the 3rd (2011) National Conference (4) Interface: Computers and Human Society, Information Processing Society of Japan, Mar. 2, 2011, pp. 4-57 to 4-58.

(Continued)

*Primary Examiner* — Bradley W Holder
(74) *Attorney, Agent, or Firm* — Mannava & Kang, P.C.

(57) ABSTRACT

According to an embodiment of a first aspect of the invention, there is provided a distributed network comprising a plurality of subnets. Each of the plurality of subnets comprises a changeable set of nodes. The network is configured to generate for each of the plurality of subnets, by a distributed key generation protocol, an individual static verification key of a public-key signature scheme and a first set of corresponding secret key shares for a first set of nodes of the respective subnet. The network is further configured to redistribute, for each of the plurality of subnets, by a secret-redistribution protocol, the secret key shares of the respective first set of secret key shares to a second set of nodes of the respective subnet, thereby creating a second set of secret key shares corresponding to the same static verification key of the respective subnet.

(Continued)

Further aspects of the invention relate to a corresponding computer-implemented method, a node, a computer program product and a software architecture.

15 Claims, 7 Drawing Sheets

(56) References Cited

U.S. PATENT DOCUMENTS

2003/0097425 A1* 5/2003 Chen ............... H04L 61/50
709/223
2018/0331895 A1* 11/2018 Tang ............... H04L 67/1097

FOREIGN PATENT DOCUMENTS

| JP | 2020517134 A | 6/2020 |
| JP | 2020517136 A | 6/2020 |
| RO | 134065 | 4/2020 |

OTHER PUBLICATIONS

Machine English translation of "Notice of Reasons for Refusal" for Japanese Patent Application No. 2023-523326, dated Jun. 5, 2024, 4 pages.
Sal K. D. Maram et al., "CHURP: Dynamic-Committee Proactive Secret Sharing", Proceedings of the 2019 ACM SIGSAC Conference on Computer and Communications Security, ACM 2019, pp. 2369-2386.
"International Search Report and Written Opinion for PCT Application No. PCT/EP2020/068420", mailed Mar. 25, 2021, 8 pages.
David Schultz et al., "MPSS: Mobile Proactive Secret Sharing", ACM Trans. Inf. Syst. Secur. vol. 13, No. 4, Article 34 (Dec. 2010), 32 pages.
Paul Feldman, "A practical scheme for non-interactive verifiable secret sharing". In 28th Annual Symposium on Foundations of Computer Science, pp. 427-437, Los Angeles, California, Oct. 12-14, 1987. IEEE Computer Society Press.
Ran Canetti et al., "UC Non-Interactive, Proactive, Threshold Ecdsa", IACR Cryptol. ePrint Arch. 2020: 492 (2020), 55 pages.
Rosario Gennaro et al., "Secure distributed key generation for discrete-log based cryptosystems", In Jacques Stern, editor, Advances in Cryptology—Eurocrypt'99, vol. 1592 of Lecture Notes in Computer Science, pp. 295-310, Prague, Czech Republic, May 2-6, 1999. Springer, Heidelberg, Germany.
Tal Rabin, "A simplified approach to threshold and proactive RSA", Annual International Cryptology Conference, 1998—Springer, 16 pages.
Torben P. Pedersen, A threshold cryptosystem without a trusted party (extended abstract) (rump session). In Donald W. Davies, editor, Advances in Cryptology—Eurocrypt'91, vol. 547 of Lecture Notes in Computer Science, pp. 522-526, Brighton, UK, Apr. 8-11, 1991. Springer, Heidelberg, Germany.
Amir Herzberg et al., "Proactive Secret Sharing or: How to Cope With Perpetual Leakage", Crypto '95: Proceedings of the 15th Annual International Cryptology Conference on Advances in Cryptology. Santa Barbara, California, USA, Aug. 27-31, 1995, pp. 339-352. ISBN 978-3-540-60221-7.
Japanese Patent Office, "machine English translation of Notice of Reasons for Refusal for Japanese Patent Application No. 2023-523326", dated Feb. 5, 2025, 4 pages.

* cited by examiner

| | $pk_A$ | $pk_A$ | $pk_A$ | $pk_A$ | $pk_A$ |
|---|---|---|---|---|---|
| N1 | $share_{1,0}$ | $share_{1,1}$ | $share_{1,2}$ | $share_{1,3}$ | $share_{1,4}$ |
| N2 | $share_{2,0}$ | $share_{2,1}$ | $share_{2,2}$ | $share_{2,3}$ | $Share_{2,4}$ |
| N3 | $share_{3,0}$ | $share_{3,1}$ | $share_{3,2}$ | $share_{3,3}$ | |
| N4 | $share_{4,0}$ | $share_{4,1}$ | $share_{4,2}$ | $share_{4,3}$ | $share_{4,4}$ |
| N5 | $share_{5,0}$ | $share_{5,1}$ | $share_{5,2}$ | $share_{5,3}$ | $Share_{5,40}$ |
| N6 | | | $share_{6,2}$ | $share_{6,3}$ | $share_{6,4}$ |
| N7 | | | | | $share_{7,4}$ |
$t_0 \quad t_1 \quad t_2 \quad t_3 \quad t_4 \quad$ time
FIG. 3
Node of SNA
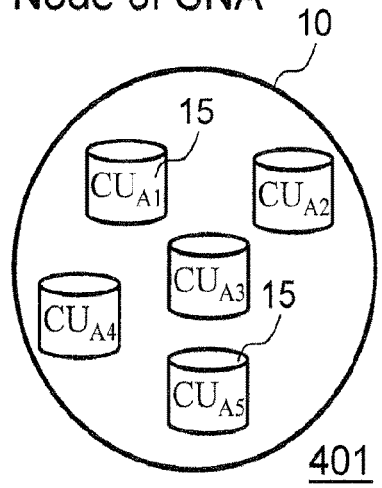
Node of SNB
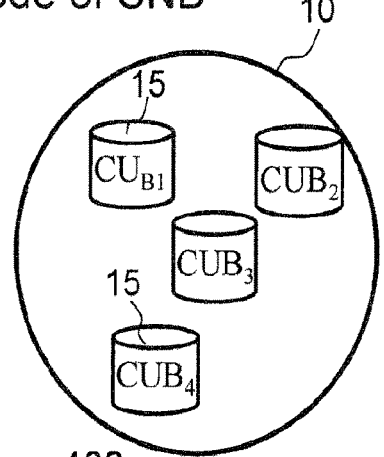
FIG. 4

DISTRIBUTED NETWORK HAVING A PLURALITY OF SUBNETS

CLAIM FOR PRIORITY

The present application is a national stage filing under 35 U.S.C 371 of PCT application number PCT/EP2020/068420, having an international filing date of Jun. 30, 2020, the disclosure of which is hereby incorporated by reference in its entirety.

TECHNICAL FIELD

The present invention pertains to a distributed network comprising a plurality of subnets. Each of the subnets comprises one or more nodes.

Further aspects relate to a method for key management in distributed networks having a plurality of subnets, a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may contain small programs known e.g. as smart contracts.

In order for a transaction to be written to the blockchain, it must be "validated" by the network. In other words, the network nodes have to gain consent on blocks to be written to the blockchain. Such consent may be achieved by various consensus protocols.

One type of consensus protocols are proof-of-work consensus protocols. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols are proof-of-stake-consensus protocols. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Apart from cryptocurrencies, distributed networks may be used for various other applications. In particular, they may be used for providing decentralized and distributed computing capabilities and services.

One problem of distributed networks is to provide computational results of a subnet, e.g. state information, to an external user of the subnet and/or to other subnets in a secure, efficient, verifiable and/or user-friendly way.

DISCLOSURE OF THE INVENTION

Accordingly, one object of an aspect of the invention is to provide a distributed network with advanced functionalities, in particular in terms of key management.

A further object of a further aspect of the invention is to provide a distributed network which facilitates the verification of computational results of the network, in particular state information, in a secure, efficient and/or user-friendly way.

According to an embodiment of a first aspect of the invention, there is provided a distributed network comprising a plurality of subnets. Each of the plurality of subnets comprises a changeable set of nodes. The network is configured to generate for each of the plurality of subnets, by a distributed key generation protocol, an individual static verification key of a public-key signature scheme and a first set of corresponding secret key shares for a first set of nodes of the respective subnet.

The network is further configured to redistribute, for each of the plurality of subnets, by a secret-redistribution protocol, the secret key shares of the respective first set of secret key shares to a second set of nodes of the respective subnet, thereby creating a second set of secret key shares corresponding to the same static verification key of the respective subnet.

According to such an embodied method each of the plurality of subnets has an individual, i.e. its own static verification key which remains constant over time. According to embodiments the static verification key may remain constant over the whole lifetime of the corresponding subnet. A static verification key may hence also be denoted as constant verification key.

While the static verification key remains constant, the corresponding secret key shares may change over time. Furthermore, the set of nodes which form or represent a subnet may change over time, i.e. nodes may be added or nodes may be removed from a respective subnet.

More particularly, initially a subnet comprises a first set of nodes which may also be denoted as initial set of nodes. According to an embodiment, each of the nodes of the first set of nodes hold a secret key share of a first set of secret key shares. The first set of secret key shares correspond to the static verification key. More particularly, the static verification key allows to verify joint signatures which have been executed by a permissible subset of the secret key shares.

The static verification keys are keys of a public-key signature scheme and may also be denoted as public keys. The corresponding secret key shares may also be denoted as signature key shares or signature keys.

A public-key signature scheme according to embodiments of the invention may comprise e.g. keys of a public-key signature and encryption scheme such as RSA or keys of a public-key signature scheme such as Schnorr or DSA.

Subsequently, the first set of secret key shares may be redistributed to a second set of secret key shares by means of a secret redistribution protocol. In other words, the secret redistribution protocol updates the secret key shares of the secret key which corresponds to the static verification key.

Such a distributed network with static verification keys for the plurality of subnets provides advantages in terms of key-management, verification and/or certification. More particularly, as on the one hand the static verification of the plurality of subnets remains constant over time, a verifier can always use the same static verification key for verifying information provided by the subnet. On the other hand, with the redistribution of the secret key shares the distributed network may be adapted to the respective needs of the distributed network in terms of security and flexibility. Hence such a distributed network provides for the users of the distributed network the advantage that they can always use the same static verification key to verify information provided by a respective subnet of the network. And on top of that, it provides flexibility for the subnets, namely that the subnets can nevertheless internally update the secret key shares for security or other reasons.

According to an embodiment, each node of a subset of nodes of the first set of nodes holds one secret key share of the first set of secret key shares.

According to an embodiment, each node of a subset of nodes of the second set of nodes holds one of the secret key shares of the second set of key shares.

According to an embodiment the subset of the first set may comprise all the nodes of the first set or not all the nodes of the first set. In the first case each node of the first set of nodes holds one secret key share of the first set of secret key shares. In the latter case only an assigned committee of the first set of nodes May hold the secret key shares.

According to an embodiment the subset of the second set may comprise all the nodes of the second set or not all the nodes of the second set. In the first case each of the nodes of the second set of nodes hold one secret key share of the second set of secret key shares. In the latter case only an assigned committee of the second set of nodes may hold the secret key shares.

According to an embodiment, the nodes of each subnet are configured to run an assigned set of computational units. The computational units of the subnets are configured to execute computations in a deterministic and replicated manner across the subnets.

Such a network performs replicated computing across the subnets. Accordingly, the subnets may also be denoted as replicated computing clusters. For such a network the provision of constant/static verification keys for the plurality of subnets is in particular advantageous.

A computational unit may be defined as a piece of software that is running on a node of the network and which has its own unit or execution state. Each of the subnets is configured to replicate the assigned set of computational units, in particular the unit states/execution states/states of the computational units across the subnet.

According to embodiments, the replication of the unit state of the computational units may be facilitated by performing an active replication in space of the assigned subset of the computational units on each node of the subnets.

According to an embodiment, the network is furthe configured to redistribute, for each of the plurality of subnets, by the secret redistribution protocol, the secret key shares of the second set of secret key shares to a third set of nodes of the respective subnet. This creates a third set of secret key shares corresponding to the same static verification key of the respective subnet.

According to an embodiment, each node of a subset of the third set of nodes holds one of the secret key shares of the third set of key shares.

According to such an embodiment the secret redistribution protocol may be used to perform further updates of the secret key shares. This may be in particular useful in terms of security of the network and/or in terms of configuration flexibility of the network. This step may be repeated as desired.

More particularly, according to some embodiments the first subset of nodes may be equal to the second subset of nodes and/or the second subset of nodes may be equal to the third subset of nodes. In other words, the configuration of the corresponding subnet has not changed. In such a scenario, the update of the secret key shares improves in particular the security of the distributed network. Such an approach may be in particular used to implement proactive security. In this respect, according to an embodiment the secret redistribution protocol may be performed for each subnet regularly at predefined intervals. This may prevent that adversaries gain control over a subnet by collecting a sufficient number of key secret key shares which allow to reconstruct the secret key corresponding to the static verification key of the subnet.

According to another embodiment, the first subset of nodes is different from the second subset of nodes and/or the second subset of nodes is different from the third subset of nodes.

In such a scenario, the update of the secret key shares allows the adaption of the secret key shares to a new or adapted configuration of the subnet, while the static verification key remains the same. Accordingly, even though the configuration of a subnet has changed, external user or external subnets that receive information from this subnet do not need to worry about the change and do not even need to be aware of this change as the static verification key remains the same.

In this respect, embodiments of the invention allow to hide the current subnet configuration from the users of the distributed network. All that the users need in order to verify information from a subnet is the static verification key, while the corresponding subnet configuration and distribution of the secret key shares may be hidden. This may prevent or at least impede adaptive attacks on nodes of a subnet.

According to embodiments, the distributed key generation protocol may be in particular a distributed threshold key generation protocol.

Hence according to such an embodiment the distributed key generation protocol generates a static threshold verification key of a public-key signature scheme and a set of corresponding threshold secret key shares for a first set of nodes of the respective subnet.

According to such an embodiment a permissible subset of the secret key-shares held by the nodes may be used to generate a signature under the static verification key. Such a permissible subset may be a predefined number of the secret key shares or in general any predefined combination of secret key shares. According to embodiments a permissible subset may be generally defined as predefined access structure.

According to embodiments, the secret-redistribution protocol may be in particular a threshold key redistribution protocol.

According to such an embodiment the secret redistribution protocol is configured to redistribute secret threshold key shares which correspond to a threshold verification key.

According to embodiments, the nodes of the plurality of subnets are configured to execute, by a permissible subset of the nodes, a joint signature on subnet information by their secret key shares.

This provides a certification of the subnet information by means of the joint signature. The joint signature corresponds to the static verification key, i.e. it can be verified with the static verification key. The subnet information may be generally any information of the subnet, in particular information about the execution state of the computational units of the subnet.

The signed subnet information may be provided to users of the distributed network and/or to another receiving subnet.

According to an embodiment, the user of the distributed network and/or the receiving subnet is configured to verify the joint signature of the subnet information by means of the static verification key of the corresponding subnet.

According to an embodiment, the distributed network comprises a governance subnet comprising a plurality of configuration nodes. The governance subnet is configured to store the static verification keys of the plurality of subnets and to hold a root verification key of a public key signature scheme and a plurality of corresponding secret key shares. The governance subnet is further configured to receive verification key requests for providing the static verification keys of one or more subnets and to provide, in response to a verification key request, a verification key response comprising the static verification keys of one or more subnets. The governance subnet is further configured to sign, by a subset of the nodes of the governance subnet, the verification key response with a permissible subset of the secret key share corresponding to the root verification key, thereby creating a joint signature on the verification key response.

Such a governance subnet may provide a single root of trust for the user. More particularly, the user does not need to be aware of the respective subnet configurations and does not need to administer the static verification keys of the subnets. Instead the user may get any required static verification keys from the governance subnet and may verify the received static verification keys by the root verification key.

According to embodiments the joint signature may be in particular a threshold-signature or in other words a signature by a threshold key/threshold secret key.

According to an embodiment of a method aspect of the invention, a computer-implemented method for managing verification keys in a distributed network which comprises a plurality of subnets is provided.

The method comprises generating for each of the plurality of subnets, by a distributed key generation protocol, an individual static verification key of a public-key signature scheme and a first set of corresponding secret key shares for a first set of nodes of the respective subnet. The method further comprises redistributing, for each of the plurality of subnets, by a secret-redistribution protocol, the secret key shares of the respective first set of secret key shares to a second set of nodes of the respective subnet, thereby creating a second set of secret key shares corresponding to the same static verification key of the respective subnet.

According to an embodiment, each node of the first set of nodes holds one secret key share of the first set of secret key shares. According to an embodiment, each node of the second set of nodes holds one of the secret key shares of the second set of key shares.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

According to an embodiment of another aspect of the invention, a computer program product for operating a node of a distributed network is provided.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 3 shows a corresponding table comprising a corresponding evolvement of sets of secret keys of the second subnet;

FIG. 4 illustrates in a more detailed way computational units running on nodes of the network;

MODES FOR CARRYING OUT THE INVENTION

Figure 1:
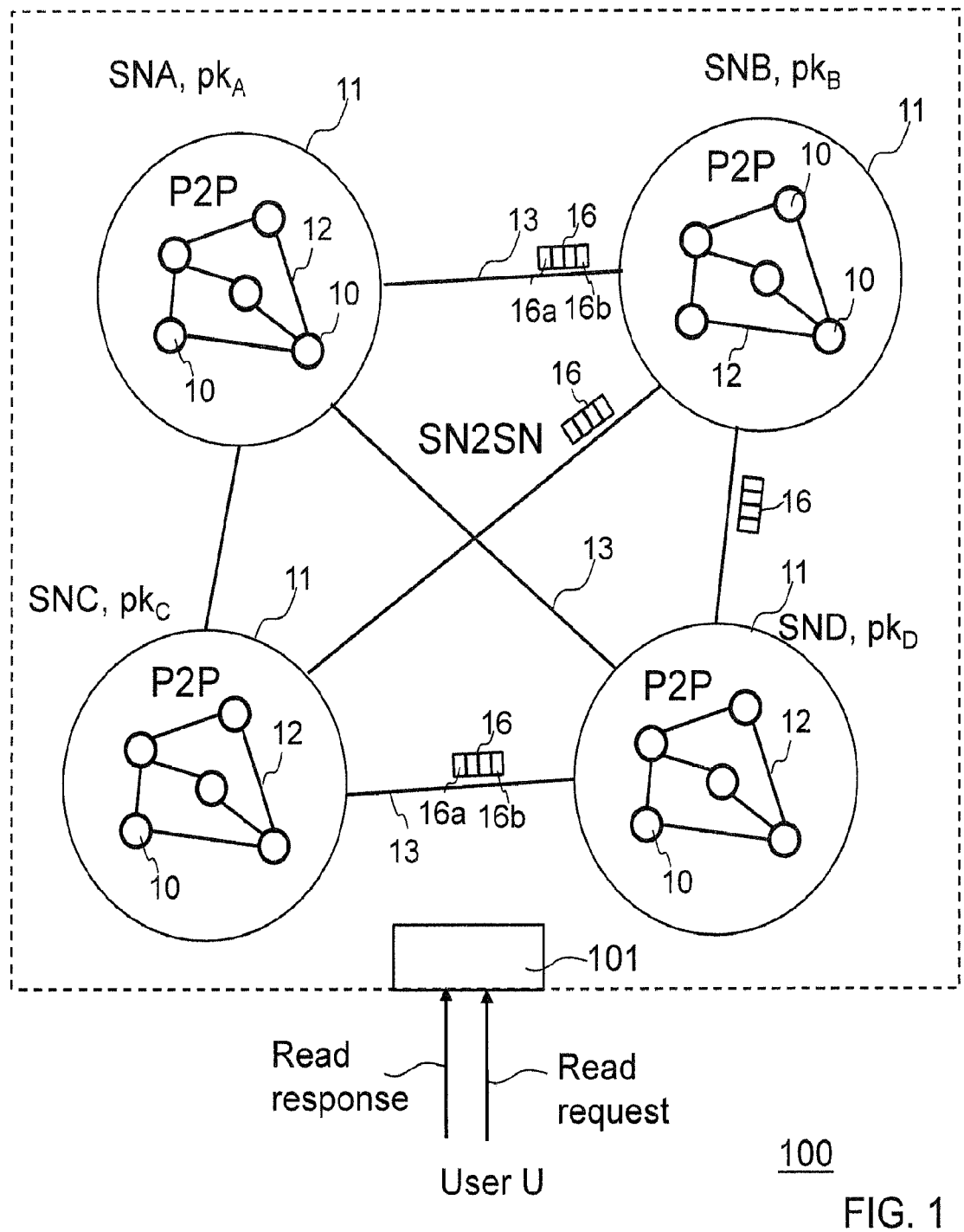
FIG. 1 shows an exemplary block diagram of a distributed network according to an embodiment of the invention.

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be in particular embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A verification key: a bit-string of a public key signature scheme intended to be widely publicized. A verification key may also be denoted as public key and may be used e.g. for the verification of digital signatures of the public key signature scheme.

A public-key signature scheme according to embodiments of the invention may comprise e.g. keys of a public-key signature and encryption scheme such as RSA or keys of a public-key signature scheme such as Schnorr or DSA.

Secret key (sk): a bit-string related to a public key, in particular a verification key, enabling some cryptographic operation, in particular digitally signing a message and/or encrypting a ciphertext.

Distributed key generation (DKG): a protocol enabling a set of dealers to create a public key, in particular a verification key, and provide a set of receivers with a secret key share of the corresponding secret key.

Secret redistribution protocol: A secret redistribution protocol may also be denoted as a secret resharing protocol. A protocol to update the secret key shares of a secret key. According to some embodiments the protocol may provide the new or updated secret key shares to the former holders of the secret key shares. According to other embodiments, the protocol may provide the new or updated secret key shares to a new, in particular a different set of receivers.

(n, t)-threshold key/threshold secret key: Such a threshold key has a threshold t and a number of secret key shares s1, . . . , sn such that any t secret key shares enable reconstruction of the secret key, while t-1 shares do not suffice to determine the secret key. In case of a threshold public key signature scheme, any t secret key shares enable the execution of a valid signature under the threshold public key/verification key, while t-1 shares do not suffice to execute a valid signature.

Verifiable secret sharing (VSS): a protocol enabling a single dealer to generate a random secret s, a threshold secret sharing s1, . . . , sn to the set of receivers, and evidence each receiver can use to verify its share si is correct Proactive security: a security notion capturing a multi-party system tolerating at any time the compromise of t-1 parties. Time is divided into epochs, and in each epoch at most t-1 parties are compromised, but the attacker is mobile in the sense that the set of compromised parties may differ from epoch to epoch. A distributed key management system with proactive security can be made by dividing time into epochs and using a fresh threshold secret sharing of the secret key in each epoch.

Public key encryption with forward secrecy: a public key encryption scheme where time is divided into epochs and the private decryption key evolves over time so that, even if it is compromised it does not aid in decrypting ciphertexts from a previous epoch According to embodiments, the Feldman protocol [Fel87], joint Feldman protocol [Ped91] and the GJKR protocol [GJKR99] may be used as distributed key generation protocols. These protocols are e.g. published as follows and their corresponding disclosure is herewith incorporated by reference:

[Fel87] Paul Feldman. A practical scheme for non-interactive verifiable secret sharing. In 28th Annual Symposium on Foundations of Computer Science, pages 427-437, Los Angeles, California, Oct. 12-14, 1987. IEEE Computer Society Press.

[Ped91] Torben P. Pedersen. A threshold cryptosystem without a trusted party (extended abstract) (rump session). In Donald W. Davies, editor, Advances in Cryptology-EUROCRYPT' 91, volume 547 of Lecture Notes in Computer Science, pages 522-526, Brighton, UK, Apr. 8-11, 1991. Springer, Heidelberg, Germany.

[GJKR99] Rosario Gennaro, Stanislaw Jarecki, Hugo Krawczyk, and Tal Rabin. Secure distributed key generation for discrete-log based cryptosystems. In Jacques Stern, editor, Advances in Cryptology-EUROCRYPT' 99, volume 1592 of Lecture Notes in Computer Science, pages 295-310, Prague, Czech Republic, May 2-6, 1999. Springer, Heidelberg, Germany.

The following protocols may be used e.g. according to embodiments of the invention as secret redistribution protocols:

Herzberg, Amir; Jarecki, Stanislaw; Hugo, Krawczyk; Yung, Moti (1995). Proactive Secret Sharing Or: How to Cope With Perpetual Leakage. CRYPTO'95: Proceedings of the 15th Annual International Cryptology Conference on Advances in Cryptology. London, UK: Springer-Verlag. pp. 339-352. ISBN 978-3-540-60221-7.

A simplified approach to threshold and proactive RSA", by T Rabin-Annual International Cryptology Conference, 1998-Springer.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are distributed over a plurality of subnetworks 11. The subnetworks 11 may also be denoted as subnets. In the example of FIG. 1, four subnets 11 denoted with SNA, SNB, SNC and SND are provided.

Each of the plurality of subnets 11 is configured to run a set of computational units on each node 10 of the respective subnet 11. According to embodiments a computational unit shall be understood as a piece of software, in particular as a piece of software that comprises or has its own unit state. The unit state may also be denoted as execution state.

The network 100 comprises communication links 12 for intra-subnet communication within the respective subnet 11, in particular for intra-subnet unit-to-unit messages to be exchanged between computational units assigned to the same subnet.

Furthermore, the network 100 comprises communication links 13 for inter-subnet communication between different ones of the subnets 11, in particular for inter-subnet unit-to-unit messages to be exchanged between computational units assigned to different subnets.

Accordingly, the communication links 12 may also be denoted as intra-subnet or Peer-to-Peer (P2P) communications links and the communication links 13 may also be denoted as inter-subnet or Subnet-to-Subnet (SN2SN) communications links.

The network 100 is configured to exchange unit-to-unit messages between the computational units of the network via a messaging protocol based on the subnet-assignment.

According to embodiments, the distributed network may be in particular configured to exchange inter-subnet messages 16 between the subnets SNA, SNB, SNC and SND via a messaging protocol. The inter-subnet messages 16 may be in particular embodied as inter-subnet unit-to-unit messages 16a to be exchanged between computational units that have been assigned to different subnets according to the subnet-assignment. As an example, the distributed network 100 may be configured to exchange a unit-to-unit message 16a between the computational unit $CU_{A1}$ as sending computational unit running on the subnet SNA and the computational unit $CU_{B2}$ as receiving computational unit running on the subnet SNB (see FIG. 4). In addition, the inter-subnet messages 16 may be embodied as signalling messages 16b. The signalling messages 16b may encompass acknowledgement messages (ACK) adapted to acknowledge an acceptance or receipt of the unit-to-unit messages or non-acknowledgement messages (NACK) adapted to not-acknowledge an acceptance (corresponding to a rejection) of the unit-to-unit messages, e.g. to indicate a transmission failure.

According to embodiments, a unit state or execution state shall be understood as all the data or information that is used by the computational unit, in particular the data that the computational unit stores in variables, but also data the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments of the invention the subnets 11 are configured to replicate the set of computational units across the respective subnet 11. More particularly, the subnets 11 are configured to replicate the unit state/execution state of the computational units across the respective subnet 11.

The network 100 may comprise a plurality of interfaces 101 that may be used to exchange information with users U of the distributed network. As an example, the users U may send read request via the interface 101 to the distributed network and receive a read response, e.g. execution state information comprising computational results. According to preferred embodiments, the user does not need to be aware of the internal structure of the distributed network 100. In particular, the user may preferably not be aware of the subnet configuration and the respective subnet that is handling her read request.

The subnets 11 may be reconfigured over time. More particularly, the number of nodes of the subnets 11 may change over time. As an example, nodes may be added to the subnets 11 and/or nodes may be removed from the subnets 11. Hence the subnets 11 comprise a changeable set of nodes.

Each of the subnets 11 hold an individual or in other words separate static verification key of a public-key signature scheme. In this example the subnet SNA holds a static verification key $pk_A$, the subnet SNB holds a static verification key $pk_B$, the subnet SNC holds a static verification key $pk_C$ and the subnet SND holds a static verification key $pk_D$. A static verification key may be in the following generally referred to as $pk_X$, wherein X denotes a corresponding subnet. According to embodiments the static verification keys $pk_X$ are constant or in other words fixed over the whole lifetime of the respective subnet 11.

The static verification keys $pk_X$ are generated by a distributed key generation protocol. The distributed key generation protocol generates a first set of corresponding secret key shares $sks_1$, $sks_2$, $sks_n$, i.e. a first set of secret key shares that correspond to the respective static verification key $pk_X$. The first set of secret key shares are assigned to a first set of nodes of the respective subnet. The first set of nodes may be in particular the nodes of the respective subnet at a time $t_0$, wherein the time $t_0$ may be e.g. the time of the creation of the respective subnet. The verification keys $pk_X$ are verification keys of a public-key signature scheme. Accordingly, the verification keys $pk_X$ may be used to verify a joint signature that has been created by the nodes which hold the secret key shares $sks_1$, $sks_2$, $sks_n$. The distributed key generation protocol may be in particular a threshold key generation protocol.

While the static verification keys $pk_X$ of the distributed network 100 do not change over time, the corresponding secret key shares sks may change over time. Such a change of the secret key shares may be performed in case the set of nodes of the respective subnet has changed or it may be performed even if there is no change of the nodes of the subnet. The latter may be used to provide proactive security.

In order to change the secret key shares, the distributed network 100 performs a secret-redistribution protocol. The secret-redistribution protocol redistributes the secret key shares of the first set of secret key shares of a respective subnet to a second set of nodes of the respective subnet. This creates a second set of secret key shares which corresponds to the same static verification key of the respective subnet. As a result, each node or a subset of the second set of nodes holds one of the secret key shares of the second set of key shares.

This will be illustrated in more detail with reference to FIG. 2 and FIG. 3.

Figure 2:
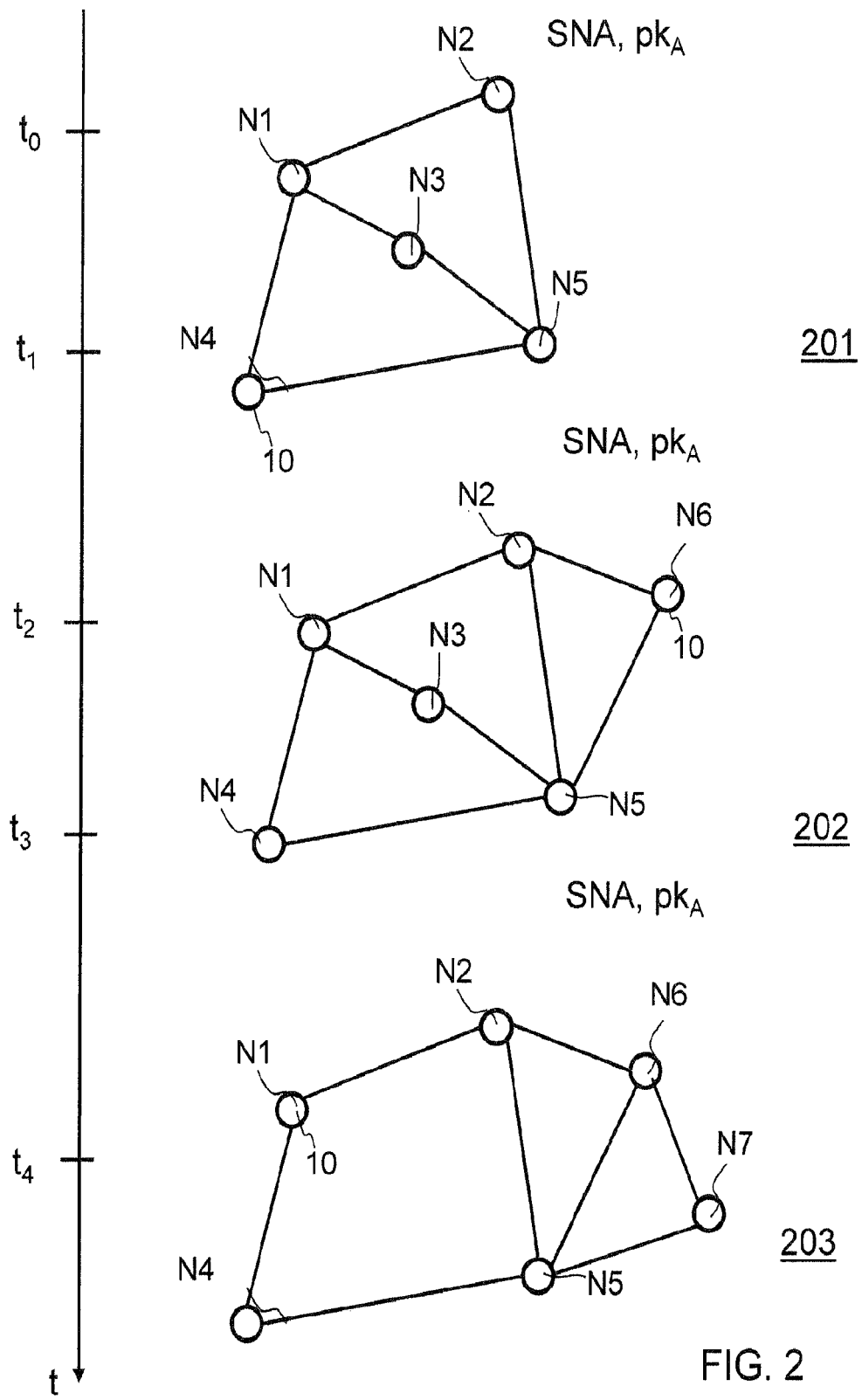
FIG. 2 shows the evolvement of a second subnet over time.

FIG. 2 shows the evolvement of a subnet SNA over time. FIG. 3 shows a corresponding table comprising a corresponding evolvement of sets of secret keys of the subnet SNA.

Referring now to FIG. 2, the subnet SNA has initially at a time $t_0$, e.g. at the time of its creation, a subnet configuration 201. According to the subnet configuration 201, the subnet SNA comprises 5 nodes N1, N2, N3, N4 and N5. The subnet SNA has a static verification key $pk_A$ of a public key signature scheme. The nodes N1, N2, N3, N4 and N5 establish a first or in other words an initial set of nodes.

Referring now to FIG. 3, the left column 301 comprises a corresponding number of nodes of the subnet SNA, more particularly the nodes N1, N2, N3, N4, N5, N6 and N7. The columns 302, 303, 304, 305 and 306 comprises the respective secret key shares of the corresponding nodes at different points in time. More particularly, column 302 corresponds to the time $t_0$, column 303 corresponds to the time $t_1$, column 304 corresponds to the time $t_2$, column 305 corresponds to the time $t_3$ and column 306 corresponds to the time $t_4$. The rows 311, 312, 313, 314, 316 and 317 comprise the secret key shares of the nodes N1, N2, N3, N4, N5, N6 and N7 respectively.

At the time $t_0$, the nodes N1, N2, N3, N4 and N5 of the subnet SNA hold secret key shares $share_{1,0}$, $share_{2,0}$, $share_{3,0}$, $share_{4,0}$ and $share_{5,0}$ respectively. The first number of the subscript denotes the respective node and the second number of the subscript the respective point in time.

At a subsequent point in time $t_1$, the subnet SNA has still the same set of nodes. Nevertheless, the distributed network has performed the secret redistribution protocol to redistribute the secret key shares $share_{1,0}$, $share_{2,0}$, $share_{3,0}$, $share_{4,0}$ and $share_{5,0}$ to a second set of nodes, which is in this example formed by the same set of nodes N1, N2, N3, N4 and N5. The secret-redistribution protocol has created or generated a second set of secret key shares $share_{1,1}$, $share_{2,1}$, $share_{3,1}$, $share_{4,1}$ and $share_{5,1}$ which are different from the first set. The second set of key shares corresponds to the same static verification key $pk_A$ of the subnet SNA.

Referring now to FIG. 2, a second subnet configuration 202 of the subnet SNA is shown which comprises an additional node N6 in addition to the former nodes N1, N2, N3, N4 and N5. This subnet configuration 202 is valid for points in time $t_2$ and $t_3$.

Referring now to FIG. 3, column 304 shows the secret key shares of the new node set at time $t_2$.

The distributed network has performed the secret redistribution protocol to redistribute the secret key shares $share_{1,1}$, $share_{2,1}$, $share_{3,1}$, $share_{4,1}$ and $share_{5,1}$ to a third set of nodes, which is in this example formed by the enhanced set of nodes N1, N2, N3, N4, N5 and N6.

The secret-redistribution protocol has created or generated a third set of secret key shares $share_{1,2}$, $share_{2,2}$, $share_{3,2}$, $share_{4,2}$, $share_{5,2}$ and $share_{6,2}$ which are different from the second set and in particular comprise 6 key shares instead of the former 5 key shares. Again, the third set of key shares corresponds to the same static verification key $pk_A$ of the subnet SNA.

At a subsequent point in time $t_3$, the subnet SNA has still the same set of nodes N1, N2, N3, N4, N5 and N6. The distributed network has performed the secret redistribution protocol to redistribute the secret key shares $share_{1,2}$, $share_{2,2}$, $share_{3,2}$, $share_{4,2}$, $share_{5,2}$ and $share_{6,2}$. Accordingly, the secret-redistribution protocol has created or generated another new set of secret key shares $share_{1,3}$, $share_{2,3}$, $share_{3,3}$, $share_{4,3}$, $share_{5,3}$ and $share_{6,3}$ which are different from the previous set. The new set of key shares corresponds again to the same static verification key pkA of the subnet SNA.

Referring now to FIG. 2, a third subnet configuration 203 of the subnet SNA is shown which comprises an additional node N7, while the former node N3 has been removed. This subnet configuration 203 is valid for a point in time $t_4$.

Referring back to FIG. 3, column 306 shows the secret key shares of the new node set at time $t_4$.

The distributed network has performed the secret redistribution protocol to redistribute the secret key shares $share_{1,3}$, $share_{2,3}$, $share_{3,3}$, $share_{4,3}$, $share_{5,3}$ and $share_{6,3}$ to the new set of nodes N1, N2, N4, N5, N6 and N7. Accordingly, the secret-redistribution protocol has created or generated another new set of secret key shares $share_{1,4}$, $share_{2,4}$, $share_{4,4}$, $share_{5,4}$, $share_{6,4}$ and $share_{7,4}$ which are again different from the previous set and which corresponds again to the same static verification key $pk_A$ of the subnet SNA.

The distributed key generation protocol and the secret redistribution protocol may be generally performed by a set of dealers that hold secret key shares of a secret key associated with/corresponding to a static public key/static verification key and a set of receivers for receiving a (fresh) set of secret key shares corresponding to the same static verification key. The set of dealers and the set of receivers may be identical or distinct. The set of dealers and the set of receivers may be generally formed by nodes of the distributed network. According to some embodiments, the set of dealers and the set of receivers may belong to the same subnet. According to other embodiments, the set of dealers and the set of receivers may belong to different subnets. According to some embodiments, the set of dealers may be provided by a governance subnet which acts as central authority and provides/redistributes secret key shares/shares of secret key corresponding to the respective static verification key to the other subnets.

FIG. 4 illustrates in a more detailed way computational units 15 running on nodes 10 of the network 100. The network 100 is configured to assign each of the computational units which are running on the network 100 to one of the plurality of subnets, in this example to one of the subnets SNA, SNB, SNC or SND according to a subnet-assignment. The subnet-assignment of the distributed network 100 creates an assigned subset of the whole set of computational units for each of the subnets SNA, SNB, SNC and SND.

More particularly, FIG. 4 shows on the left side 401 a node 10 of the subnet SNA of FIG. 1. The subnet assignment of the distributed network 100 has assigned a subset of five computational units 15 to the subnet SNA more particularly the subset of computational units $CU_{A1}$, $CU_{A2}$, $CU_{A3}$, $CU_{A4}$ and $CU_{A5}$. The assigned subset of computational units $CU_{A1}$, $CU_{A2}$, $CU_{A3}$, $CU_{A4}$ and $CU_{A5}$ runs on each node of the subnet SNA. Furthermore, the assigned subset of computational units $CU_{A1}$, $CU_{A2}$, $CU_{A3}$, $CU_{A4}$ and $CU_{A5}$ is replicated across the whole subnet SNA such that each of the computational units $CU_{A1}$, $CU_{A2}$, $CU_{A3}$, $CU_{A4}$ and $CU_{A5}$ traverses the same unit states/execution states. This may be implemented in particular by performing an active replication in space of the unit states of the computational units $CU_{A1}$, $CU_{A2}$, $CU_{A3}$, $CU_{A4}$ and $CU_{A5}$ on each of the nodes 10 of the subnet SNA.

Furthermore, FIG. 4 shows on the right side 402 a node 10 of the subnet SNB of FIG. 1 on which four computational units 15 are run, more particularly the set of computational units $CU_{B1}$, $CU_{B2}$, $CU_{B3}$ and $CU_{B4}$. The set of computational units $CU_{B1}$, $CU_{B2}$, $CU_{B3}$ and $CU_{B4}$ runs on each node 10 of the subnet SNB. Furthermore, the set of computational units $CU_{B1}$, $CU_{B2}$, $CU_{B3}$ and $CU_{B4}$ is replicated across the whole subnet SNB such that each of the computational units $CU_{B1}$, $CU_{B2}$, $CU_{B3}$ and CUBA has the same unit state, e.g. by performing an active replication in space of the unit state as mentioned above.

Figure 5:
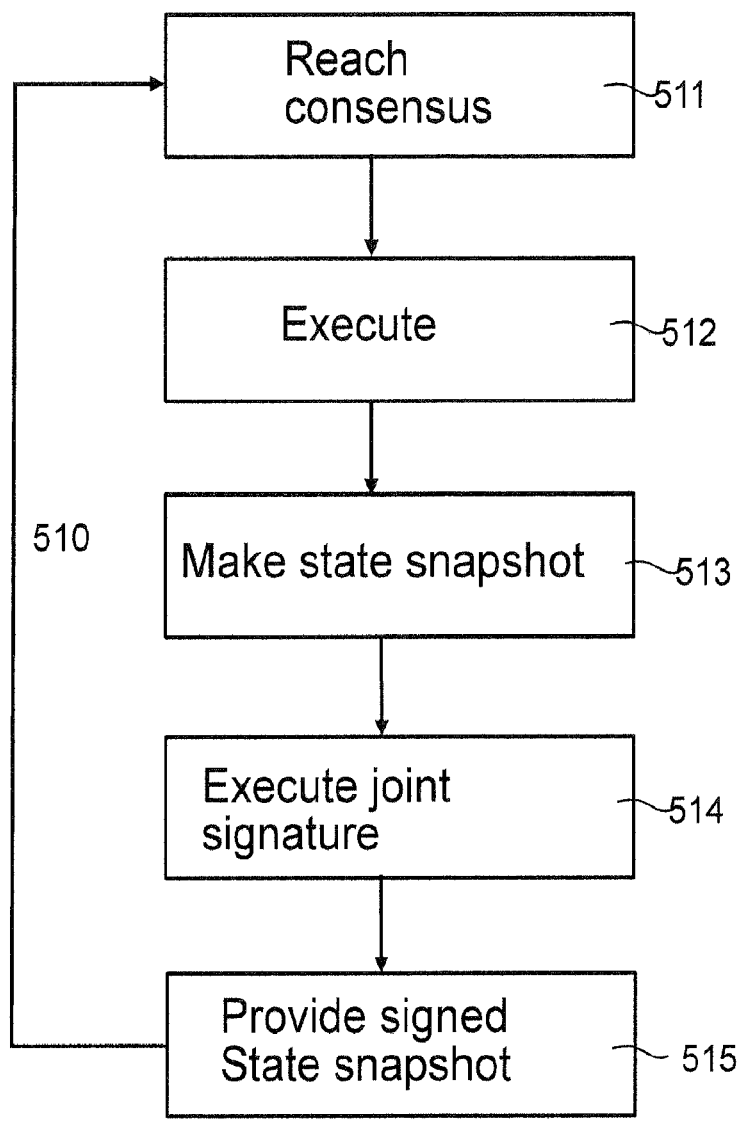
FIG. 5 shows a flow chart of method steps of a method according to an embodiment of the invention.

FIG. 5 shows a flow chart of method steps of a method according to an embodiment of the invention.

The method performs a plurality of processing loops 510 in a sequential order with an increasing height index N. N is an increasing integer, i.e. e.g. 0, 1, 2, 3 . . . N.

The processing loops 510 encompass a first loop step 511, a second loop step 512, a third loop step 513, a fourth loop step 514 and a fifth loop step 515.

At the first loop step 511, a consensus subset of the nodes of the network, in particular the nodes of a subnet or a subset of the nodes of a subnet, perform a consensus protocol to reach e.g. a consensus on the selection and processing order of a current set of execution messages that shall be executed by the respective subnet.

At the second loop step 512, the computational units of the nodes of an execution subset, in particular the nodes of a subnet or a subset of the nodes of a subnet, individually execute the selection of execution messages in a deterministic manner and replicated manner across the respective subnet.

At the third loop step 513, the nodes of the subnet make a state snapshot and store it e.g. in a cache memory of the respective node. The state snapshot may comprise the unit states/execution states of the computational units at a single consistent point in time. The state snapshot establishes an example of subnet information. In general, subnet information may be any information of the subnet that may be provided by a subnet.

At a step 514, the nodes of a respective subnet are configured to execute, by a permissible subset of the nodes, a joint signature on the state snapshot or more generally on subnet information by their secret key shares.

At a step 514, the respective subnet provides the signed state snapshot to a user of the distributed network.

Figure 6:
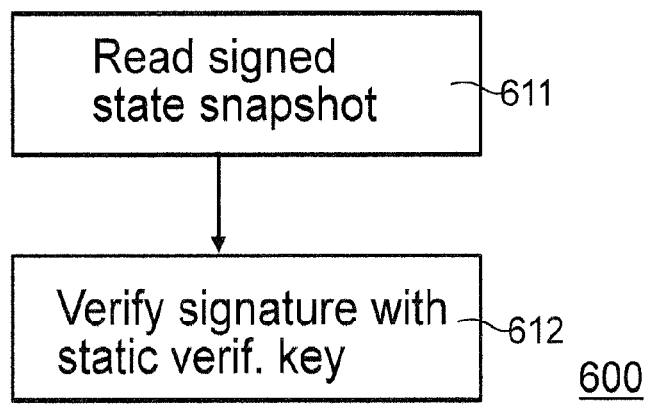
FIG. 6 shows a flow chart of further method steps of a method according to an embodiment of the invention.

FIG. 6 shows a flow chart of further method steps of a method according to an embodiment of the invention.

At a step 611, a user of the distributed network may read the signed state snapshot e.g. via the user interface 101 as shown in FIG. 1.

At a step 612, the user may then verify the joint signature of the state snapshot by means of the static verification key of the corresponding subnet.

Figure 7:
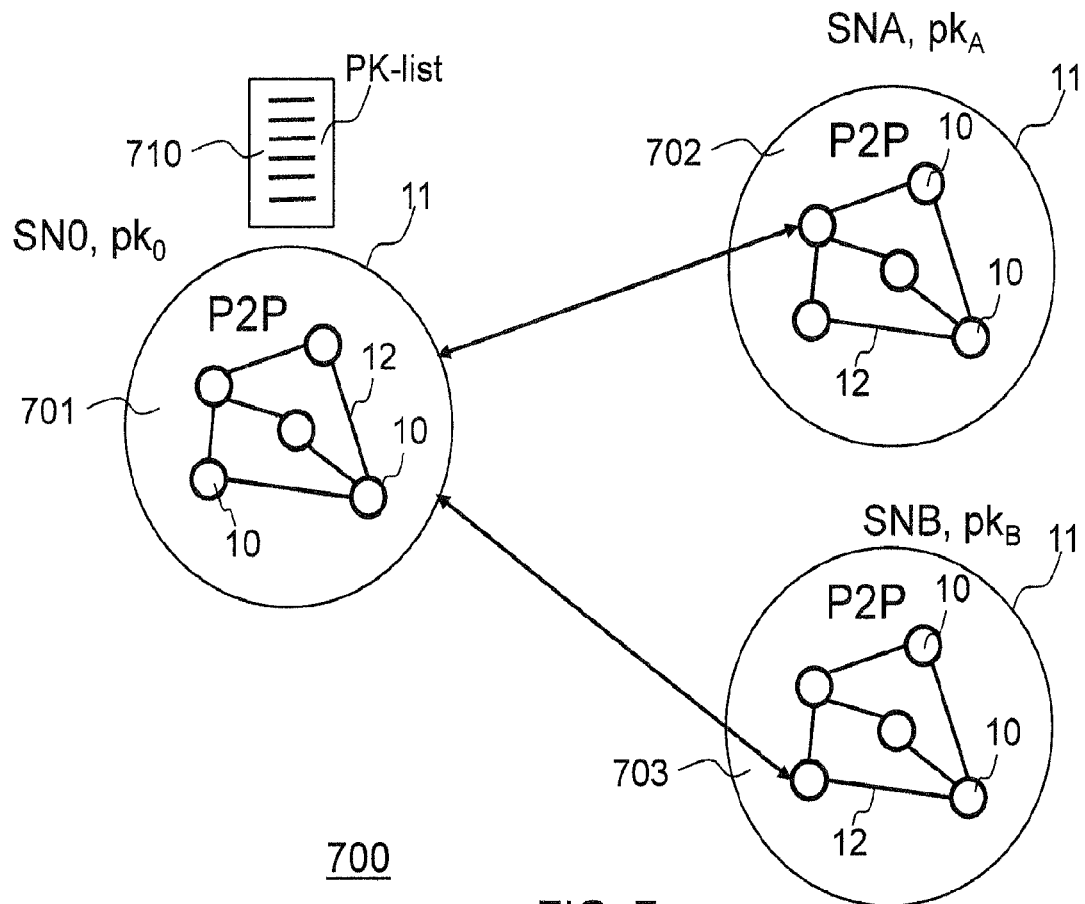
FIG. 7 illustrates a schematic view of a distributed network according to an embodiment of the invention.

FIG. 7 illustrates a schematic view of a distributed network 700 according to an embodiment of the invention.

The distributed network 700 comprises a governance subnet 701, SN0 comprising a plurality of governance nodes 10 and a plurality of further subnets, shown in an exemplary way by subnets SNA, 702 and subnets SNB, 703. The governance subnet SN0 stores a list 710 comprising all the static verification keys $pk_X$ of the plurality of subnets X, i.e. in this example in particular the static verification keys $pk_A$ and pkp of the subnets SNA and SNB respectively.

The governance subnet SN0 further holds a root verification key pk0 of a public key signature scheme. The nodes 10 of the subnet SN0 hold a plurality of corresponding secret key shares to the root verification key pk0

Accordingly, the governance subnet SN0 establishes a single root of trust for the distributed network 700 and the nodes of the further subnets may use the root verification key pk0 in order to verify information signed by the governance subnet SN0. In particular, the governance subnet SN0 may be used by the further subnets of the distributed network to receive one or more of the static verification keys $pk_X$ of the subnets.

Figure 8:
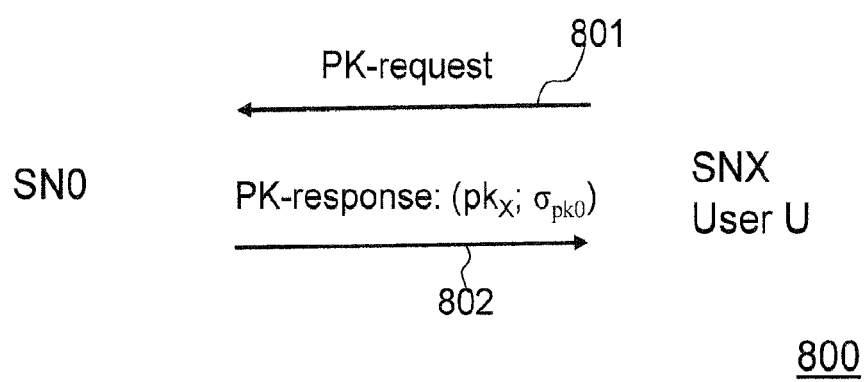
FIG. 8 shows an exemplary message flow of a key exchange between a governance subnet and a user or a another subnet.

For this, and as further illustrated in FIG. 8 which shows an exemplary message flow of a key exchange between a user U or a subnet SNX, in particular of one of the nodes of a subnet SNX.

At a step 801, a user or a node of one of the subnets SNX may send a verification key request for providing the static verification keys of one or more subnets to the governance subnet SN0.

The governance subnet SN0 may then compile in response to the received verification key request a verification key response comprising the requested verification keys of the subnets. The governance subnet SN0 may then further sign the verification key response. More particularly, the verification key response may be signed by a subset of the nodes 10 of the governance subset SN0 with a permissible subset of the secret key shares corresponding to the root verification key pk0. This has created a joint signature $\sigma_{pk0}$ on the whole verification key response or on the static verification key(s) of the verification key response.

The governance subnet SN0 may then send the signed verification key response comprising the requested static verification keys $pk_X$ of one or more subnets SNX, at a step 802, to the user U or the node of the subnet SNX.

The signature $\sigma_{pk0}$ of the verification key response may then be verified by the respective node or the user by means of the root verification key pk0.

Figure 9A:
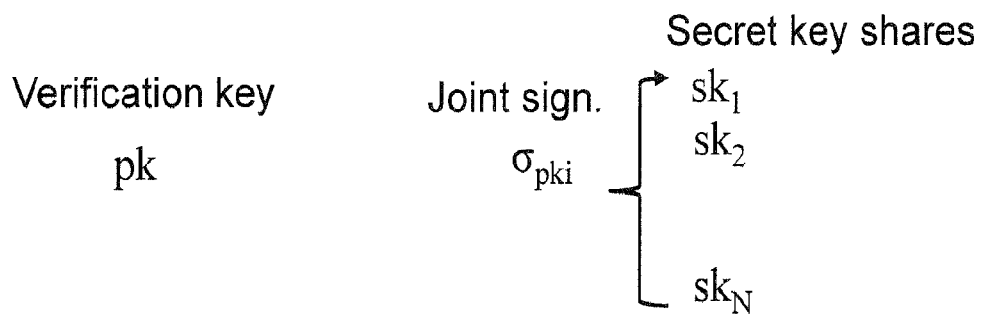
FIG. 9a and FIG. 9b illustrate embodiments of the verification keys and its corresponding secret key shares which may be used according to embodiments of the invention.
Figure 9B:
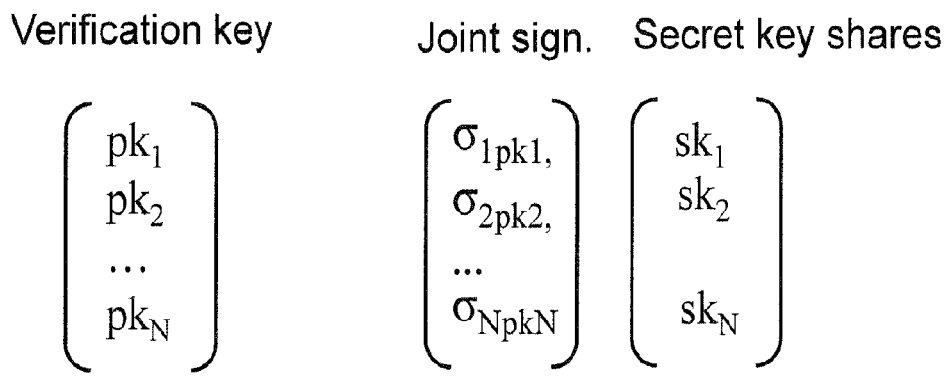

FIG. 9a and FIG. 9b illustrate embodiments of the verification keys and its corresponding secret key shares which may be used according to embodiments of the invention.

FIG. 9a shows an embodiment of a key set 910 which is generated by a distributed key generation protocol according to an embodiment of the invention. The distributed key generation protocol is embodied as distributed threshold key generation protocol.

It is assumed for this example that a number N of nodes participate in the distributed key generation protocol. The nodes may generally be the nodes of any subnet or in particular the nodes of a governance subnet which has been assigned for the initial generation of the static verification keys of the subnets and an initial subset of corresponding secret key shares.

Each of the N nodes have a secret key share $sk_1$, wherein i=1, . . . , N. The N nodes generate jointly a common static verification key (public key) $pk_X$ for a respective subnet X, wherein a predefined threshold, e.g. at least two thirds or a third of the nodes need to agree on the static verification key and jointly sign the new static verification key to generate a threshold signature $\sigma_{pkX}$.

FIG. 9b shows an embodiment of a key set 920 which is generated by a distributed key generation protocol according to an embodiment of the invention. The distributed key generation protocol is embodied a multi-signature protocol.

It is again assumed for this example that a number N of nodes participate in the distributed key generation protocol. For each of the rounds of the distributed key generation protocol each of the N nodes have a secret key share $sk_1$, wherein i=1, . . . , N.

According to this embodiment, the secret key shares may be embodied as independent secret keys ski. The N nodes agree jointly on a common public key/common verification key $\vec{pk}$, which is embodied as a vector. Again, a predefined threshold, e.g. at least two thirds of the nodes or a third of the nodes need to provide a signature on the new public key/verification key $\vec{pk}$ with its secret keys (key shares). According to this embodiment the N nodes execute individual signatures $\sigma_{1pk1}, \sigma_{2pk2}, \ldots, \sigma_{NpkN}$ on the corresponding elements of the vector verification key $\vec{pk}$ with their individual secret keys $sk_1, sk_2, \ldots, s_{kN}$. More particularly, each of the individual signatures $\sigma_{ipki}$ have a corresponding individual public key $pk_i$. Hence according to such an embodiment the verification key is embodied as vector $\vec{pk}=(pk_1, pk_2, \ldots pk_N)$ of individual public keys $pk_i$ and the joint signature is embodied as a vector $\vec{o}_{pk}=(\sigma_{1pk1}, \sigma_{2pk2}, \ldots, \sigma_{NpkN})$ as well.

According to other embodiments, also an aggregated signature scheme may be used.

Figure 10:
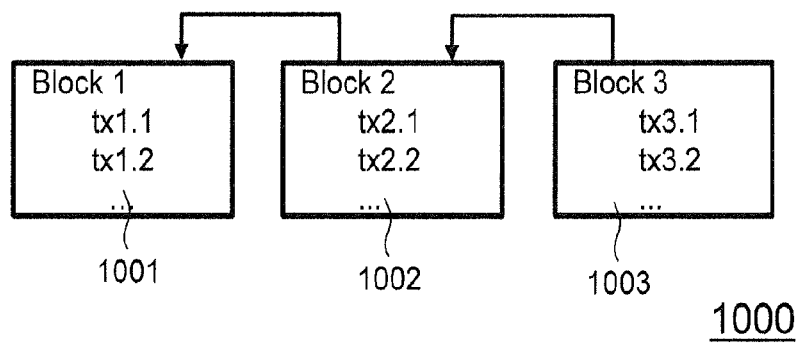
FIG. 10 illustrates the creation of blocks in distributed networks according to embodiments of the invention.

FIG. 10 illustrates the creation of blocks in distributed networks according to embodiments of the invention. The blocks may be in particular input blocks which are to be processed by the computational units of an execution subset. The blocks which are to be processed by the execution subset have been agreed upon by a consensus subset of the respective nodes of the subnet.

In this exemplary embodiment three input blocks 1001, 1002 and 1003 are illustrated. Block 1001 comprises a plurality of transactions, namely the transactions tx1.1, tx1.2 and possibly further transactions indicated with dots. Block 1002 comprises also a plurality of transactions, namely the transactions tx2.1, tx2.2 and possibly further transactions indicated with dots. Block 1003 also comprises a plurality of transactions, namely the transactions tx3.1, tx3.2 and possibly further transactions indicated with dots. The input blocks 1001, 1002 and 1003 are chained together. More particularly, each of the blocks comprises a block hash of the previous block. This cryptographically ties the current block to the previous block(s).

According to embodiments the transactions may be in particular execution messages which are to be executed by the nodes of an execution subset.

According to embodiments, the input blocks 1001, 1002 and 1003 may be created by a proof-of-stake consensus-protocol.

However, it should be noted that the input blocks generated by the consensus component do not need to be chained together according to embodiments. Rather any consensus protocol that reaches some kind of consensus between the nodes on the selection and/or processing order of received messages may be used according to embodiments.

Figure 11:
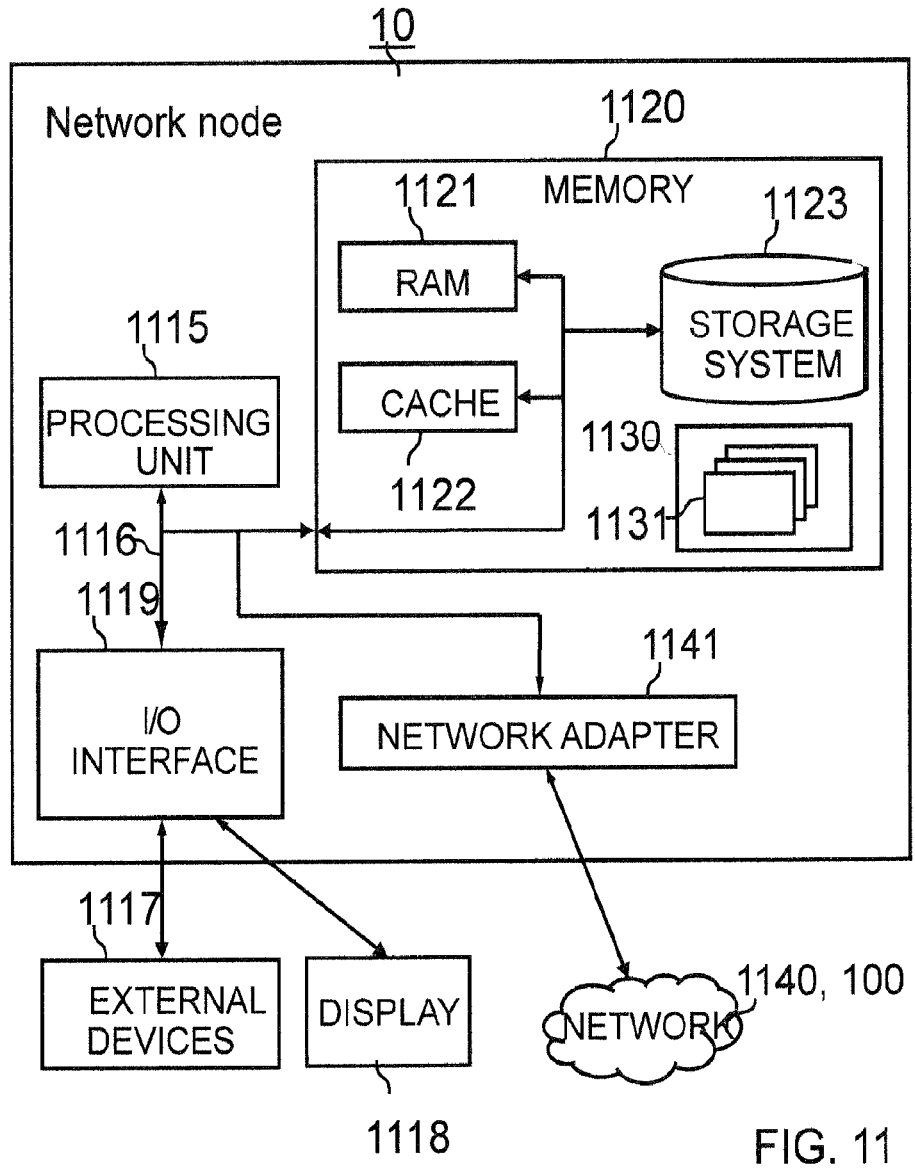
FIG. 11 shows a more detailed block diagram of a network node according to embodiments of the invention is shown.

Referring now to FIG. 11, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node may be e.g. a server computer. The network node 10 may be configured to perform or participate in a computer-implemented method according to embodiments of the invention. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1115, a system memory 1120, and a bus 1116 that couples various system components including system memory 1120 to processor 1115.

Bus 1116 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 1120 can include computer system readable media in the form of volatile memory, such as random access memory (RAM) 1121 and/or cache memory 1122. Network node 1110 may further include other removable/non-removable, volatile/non-volatile computer system storage media. By way of example only, storage system 1123 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1116 by one or more data media interfaces. As will be further depicted and described below, memory 1120 may include at least one computer program product having a set (e.g., at least one) of program modules that are configured to carry out the functions of embodiments of the invention.

Program/utility 1130, having a set (at least one) of program modules 1131, may be stored in memory 1120 by way of example, and not limitation, as well as an operating system, one or more application programs, other program modules, and program data. Each of the operating system, one or more application programs, other program modules, and program data or some combination thereof, may include an implementation of a networking environment. Program modules 1131 generally carry out the functions and/or methodologies of embodiments of the invention as described herein. Program modules 1131 may carry out in particular one or more steps of a computer-implemented method for performing inter-subnet communication including a consensus protocol in a distributed network, e.g. of one or more steps of the methods as described above.

Network node 10 may also communicate with one or more external devices 1117 such as a keyboard or a pointing device as well as a display 1118. Such communication can occur via Input/Output (I/O) interfaces 1119. Still yet, network node 10 can communicate with one or more networks 40 such as a local area network (LAN), a general wide area network (WAN), and/or a public network (e.g., the Internet) via network adapter 1141. According to embodiments the network 1140 may be in particular a distributed network comprising a plurality of network nodes 10, e.g. the network 100 as shown in FIG. 1. As depicted, network adapter 1141 communicates with the other components of network node 10 via bus 1116. It should be understood that although not shown, other hardware and/or software components could be used in conjunction with network node 10.

Figure 12:
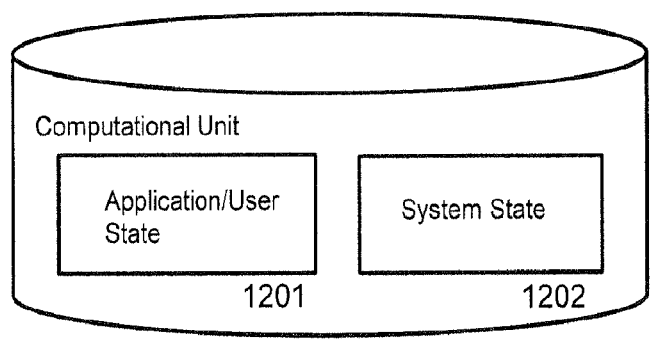
FIG. 12 shows a more detailed illustration of a computational unit according to an embodiment of the invention.

FIG. 12 shows a more detailed illustration of a computational unit 1200 according to an embodiment of the invention.

The computational unit 1200 comprises a user or application state 1201 and a system state 1202.

The user state 1201 consists of a main Web Assembly (WASM) module which implements the functionality of the computational unit and its dependent modules, together with an instance of each of the modules. A WASM module instance consists of memories, global variables and tables.

The system state 1202 cannot be freely modified by code of the computational unit. It includes meta-data, other state maintained by the system on behalf of the computational units, notably the compiled form of the WASM modules, and context and callbacks for outstanding messages.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A distributed network comprising:
    a plurality of subnets; and
    each of the plurality of subnets comprises a changeable set of nodes, and each node of the changeable set of nodes comprises a hardware processor and a memory, wherein the distributed network is configured to
    generate for each of the plurality of subnets, by a distributed key generation protocol, an individual static verification key of a public-key signature scheme and a first set of corresponding secret key shares for a first set of nodes of the respective subnet; and
    redistribute, for each of the plurality of subnets, by a secret-redistribution protocol, the secret key shares of the respective first set of secret key shares to a second set of nodes of the respective subnet, thereby creating a second set of secret key shares corresponding to the same static verification key of the respective subnet.

2. A distributed network according to claim 1, wherein each node of a subset of the first set of nodes holds one secret key share of the first set of secret key shares; and
    wherein each node of a subset of the second set of nodes holds one of the secret key shares of the second set of secret key shares.

3. A distributed network according to claim 1, wherein
    the nodes of each subnet are configured to run an assigned set of computational units; and
    the computational units of the subnets are configured to execute computations in a deterministic and replicated manner across the subnets.

4. A distributed network according to claim 1, wherein the network is further configured to
    redistribute, for each of the plurality of subnets, by the secret-redistribution protocol, the secret key shares of the second set of secret key shares to a third set of nodes of the respective subnet, thereby creating a third set of secret key shares corresponding to the same static verification key of the respective subnet.

5. A distributed network according to claim 1, wherein
    the first subset of nodes is equal to the second subset of nodes; and/or
    the second subset of nodes is equal to the third subset of nodes.

6. A distributed network according to claim 1, wherein
    the first subset of nodes is different from the second subset of nodes; and/or
    the second subset of nodes is different from the third subset of nodes.

7. A distributed network according to claim 1, wherein the distributed network is configured to perform the secret-redistribution protocol for each subnet regularly at predefined intervals.

8. A distributed network according to claim 1, wherein the distributed key generation protocol is a distributed threshold key generation protocol.

9. A distributed network according to claim 1, wherein the secret-redistribution protocol is a threshold key redistribution protocol.

10. A distributed network according to claim 1, wherein the nodes of the plurality of subnets are configured to
 execute, by a permissible subset of the nodes, a joint signature on subnet information by their secret key shares; and
 provide the signed subnet information to a user of the distributed network and/or to another receiving subnet.

11. A distributed network according to claim 10, wherein the user of the distributed network and/or the receiving subnet is configured to verify the joint signature of the subnet information by means of the static verification key of the corresponding subnet.

12. A distributed network according to claim 1, wherein the distributed network comprises a governance subnet comprising a plurality of configuration nodes; the governance subnet being configured to
 store the static verification keys of the plurality of subnets;
 hold a root verification key of a public key signature scheme and a plurality of corresponding secret key shares;
 receive verification key requests for providing the static verification keys of one or more subnets;
 provide, in response to a verification key request, a verification key response comprising the static verification keys of one or more subnets;
 signing, by a subset of the nodes of the governance subnet, the verification key response with a permissible subset of the secret key share corresponding to the root verification key, thereby creating a joint signature on the verification key response.

13. A computer-implemented method for managing verification keys in a distributed network which comprises a plurality of subnets, wherein each of the plurality of subnets comprises a plurality of nodes, the method comprising:
 generating for each of the plurality of subnets, by a distributed key generation protocol, an individual static verification key of a public-key signature scheme and a first set of corresponding secret key shares for a first set of nodes of the respective subnet; and
 redistributing, for each of the plurality of subnets, by a secret-redistribution protocol, the secret key shares of the respective first set of secret key shares to a second set of nodes of the respective subnet, thereby creating a second set of secret key shares corresponding to the same static verification key of the respective subnet.

14. A node for a distributed network, wherein the distributed network comprises a plurality of subnets, and each of the plurality of subnets comprises a changeable set of nodes, wherein the node comprises:
 a hardware processor; and
 a memory, and the node is one of the changeable set of nodes of one of the plurality of subnets, and
 wherein the distributed network is configured to generate for each of the plurality of subnets, by a distributed key generation protocol, an individual static verification key of a public-key signature scheme and a first set of corresponding secret key shares for a first set of nodes of the respective subnet; and
 redistribute, for each of the plurality of subnets, by a secret-redistribution protocol, the secret key shares of the respective first set of secret key shares to a second set of nodes of the respective subnet, thereby creating a second set of secret key shares corresponding to the same static verification key of the respective subnet.

15. A computer program product for operating a distributed network, the distributed network comprising a plurality of subnets, wherein each of the plurality of subnets comprises a set of nodes, the computer program product comprising a non-transitory computer readable storage medium having program instructions embodied therewith, the program instructions executable by one or more of the plurality of nodes to cause the one or more of the plurality of nodes to perform a method comprising:
 generating for each of the plurality of subnets, by a distributed key generation protocol, an individual static verification key of a public-key signature scheme and a first set of corresponding secret key shares for a first set of nodes of the respective subnet; and
 redistributing, for each of the plurality of subnets, by a secret-redistribution protocol, the secret key shares of the respective first set of secret key shares to a second set of nodes of the respective subnet, thereby creating a second set of secret key shares corresponding to the same static verification key of the respective subnet.

* * * * *